(12) United States Patent
Veiga (10) Patent No.: US 7,651,118 B1
(45) Date of Patent: Jan. 26, 2010

(54) POLYVINYL CHLORIDE COATED FABRICS FOR USE IN AIR BAGS (75) Inventor: Manuel J. Veiga, Tewksbury, MA (US)

(73) Assignee: Bradford Industries, Inc.

(*) Notice: Subject to any disclaimer, the term of this patent is extended or adjusted under 35 U.S.C. 154(b) by 0 days.

(21) Appl. No.: 12/202,227

(22) Filed: Aug. 30, 2008

(51) Int. Cl.
B32B 27/12 (2006.01)
B60R 21/16 (2006.01)

(52) U.S. Cl. .................. 280/728.1; 442/168; 442/286; 280/743.1

(58) Field of Classification Search ............. 280/728.1, 280/730.2, 743.1; 442/168, 169, 170, 286
See application file for complete search history.

(56) References Cited

U.S. PATENT DOCUMENTS

| | | |
|---|---|---|
| 3,970,328 A | 7/1976 | Wallsten |
| 4,143,197 A | 3/1979 | Jasionowicz et al. |
| 4,284,682 A | 8/1981 | Frosch et al. |
| 4,560,611 A | 12/1985 | Naka et al. |
| 5,110,666 A | 5/1992 | Menzel et al. |
| 5,178,938 A | 1/1993 | Magistro et al. |
| 5,226,671 A | 7/1993 | Hill |
| 5,240,765 A | 8/1993 | Takahashi et al. |
| 5,254,621 A | 10/1993 | Inoue et al. |
| 5,258,211 A | 11/1993 | Momii et al. |
| 5,298,317 A | 3/1994 | Takahashi et al. |
| 5,316,336 A | 5/1994 | Taguchi et al. |
| 5,399,402 A | 3/1995 | Inoue et al. |
| 5,514,431 A | 5/1996 | Shimomura |
| 5,529,837 A | 6/1996 | Fujiki et al. |
| 5,630,620 A | 5/1997 | Hirai et al. |
| 5,632,057 A | 5/1997 | Lyden |
| 5,647,079 A | 7/1997 | Hakamiun et al. |
| 5,650,207 A | 7/1997 | Crouch |
| 5,651,395 A | 7/1997 | Graham et al. |
| 5,704,402 A | 1/1998 | Bowen et al. |
| 5,707,711 A | 1/1998 | Kitamura |
| 5,721,046 A | 2/1998 | Shrewsburg et al. |
| 5,845,935 A | 12/1998 | Enders et al. |
| 5,863,644 A | 1/1999 | Bonigk et al. |
| 5,881,776 A | 3/1999 | Beasley, Jr. |
| 5,906,391 A | 5/1999 | Weir et al. |
| 5,921,287 A | 7/1999 | Bowen et al. |
| 6,037,279 A | 3/2000 | Brookman et al. |
| 6,042,141 A | 3/2000 | Welch et al. |

(Continued)

Primary Examiner—Arti Singh-Pandey
(74) Attorney, Agent, or Firm—Jennifer Meredith; Meredith & Keyhani, PLLC (57) ABSTRACT

The invention is directed to textile fabrics for use in air bags and side curtains having at least one coating layer of polyvinyl chloride thereon. The textile fabric can be a flat sheet, such as used in driver side air bags, or a multi-layered woven textile having preconfigured air-holding cavities therein for use in side curtains such as are installed in sport utility vehicles (SUVs). In certain embodiments of the invention coating layers of elastomeric polyurethane may be applied to the textile fabric in addition to the coating layer of polyvinyl chloride. In certain instances, the textile fabrics are coated on one side only, and in others they may be coated on both sides, i.e., on opposed first and second surfaces. In either case, the polyvinyl chloride coatings, whether alone or in combination with other polymeric coatings, provide the air bags or side curtains with superior air-holding characteristics.

13 Claims, 4 Drawing Sheets

U.S. PATENT DOCUMENTS

| | | | |
|---|---|---|---|
| 6,056,316 A | 5/2000 | Yamaji et al. |
| 6,073,961 A | 6/2000 | Bailey et al. |
| 6,113,141 A | 9/2000 | Baker |
| 6,149,194 A | 11/2000 | Breed et al. |
| 6,152,481 A | 11/2000 | Webber et al. |
| 6,168,191 B1 | 1/2001 | Webber et al. |
| 6,169,043 B1 | 1/2001 | Li |
| 6,176,515 B1 | 1/2001 | Wallner et al. |
| 6,177,365 B1 | 1/2001 | Li |
| 6,177,366 B1 | 1/2001 | Li |
| 6,199,898 B1 | 3/2001 | Masuda et al. |
| 6,200,915 B1 | 3/2001 | Adams et al. |
| 6,220,309 B1 | 4/2001 | Sollars, Jr. |
| 6,239,046 B1 | 5/2001 | Veiga et al. |
| 6,250,668 B1 | 6/2001 | Breed et al. |
| 6,270,113 B1 | 8/2001 | Wipasuramonton et al. |
| 6,294,487 B1 | 9/2001 | Keshavaraj |
| 6,344,251 B1 | 2/2002 | Keshavaraj et al. |
| 6,348,543 B1 | 2/2002 | Parker |
| 6,350,709 B1 | 2/2002 | Veiga |
| 6,364,356 B1 | 4/2002 | Keshavaraj |
| 6,429,155 B1 | 8/2002 | Li |
| 6,740,607 B2 | 5/2004 | Veiga |
| 6,753,275 B2 | 6/2004 | Veiga |
| 6,770,578 B2 | 8/2004 | Veiga |
| 2001/0005660 A1 | 6/2001 | Li et al. |
| 2001/0009829 A1 | 7/2001 | Sollars, Jr. et al. |
| 2001/0042980 A1 | 11/2001 | Sollars, Jr. |
| 2001/0049243 A1 | 12/2001 | Crouch et al. |
| 2002/0041941 A1 | 4/2002 | Ritter |

POLYVINYL CHLORIDE COATED FABRICS FOR USE IN AIR BAGS

FIELD OF THE INVENTION

This invention relates to coated textile fabrics for use in the manufacture of inflatable devices such as air bags, side air curtains or the like, for vehicle occupant restraint systems. More particularly, the invention relates to woven or knitted textile fabrics coated with one or more polymeric layers that impart superior air holding and heat sealable properties to the fabric. Moreover, the coatings are easily applied and more cost effective than those currently employed in the manufacture of these devices. The coatings are suitable for application both to flat one-layer textiles of woven, non-woven or multi-directional construction, as well as to multi-layered woven, non-woven, unidirectional, cross-ply or multi-directional fabrics having preconfigured air-holding cavities and one or more polymeric layers coated thereon.

BACKGROUND OF THE INVENTION

Presently known restraint systems for vehicles include driver and passenger side air bags which are housed in the steering wheel and in the dashboard, respectively, in a collapsed, folded condition and are adapted to be deployed instantaneously by introduction of a gas—sometimes referred to herein as "air"—upon the occurrence of a collision. Additionally, the automotive industry has introduced air bags which are housed in the rear supports of the front seats or in the rear seats to protect the cabin occupants in the event of a collision occurring on either side of the vehicle. Moreover, a further safety feature that has been made available for passenger vehicles, especially the so-called sport utility vehicles (SUVs), are air-holding side impact protective inflatable side curtains which are designed to provide a cushioning effect in the event of rollover accidents. These side curtains are housed uninflated in the roof of the vehicle or in one of the main support pillars of the vehicle, and deploy along the interior sidewalls of the cabin of the SUV in the event of a rollover.

In addition to the widely used flat textile fabrics that are coated and then sewn or stitched to form an air bag, there has more recently been introduced into this field one-piece woven fabrics (OPW) that are woven as preformed air bags or side curtains with preconfigured air-holding cavities that require little or no further sewing or stitching in the formation of the bag. These OPW fabrics, mainly used in the construction of side curtains, require only an exterior surface coating to retain air.

Each of these different types of air bags has different design and physical property requirements, such as air holding, air permeability, air pressure and volume, puncture resistance and adhesion of the coating material to a woven fabric. For example, driver side air bags must have little or no permeability and, as a result, are often made from a material having very little or no permeability. Passenger side air bags, on the other hand, require a controlled permeability, and are most often made from materials having some degree of permeability. Furthermore, all such vehicle air restraint devices must have superior packageability and anti-blocking qualities. Packageability refers to the ability for a relatively large device to be packaged (stored) in a relatively small space. Anti-blocking refers to the ability of the device to deploy almost instantaneously from the stored condition without any resistance caused by the material sticking to itself. This is an important consideration in an air bag or side curtain which could remain stored for long periods of time before it is activated.

The air holding capability of side curtains is critical since they must remain inflated for an extended period of time to protect passengers in multiple rollovers. Unlike air bags which are designed to inflate instantaneously, and to deflate almost immediately after inflation in order to avoid injury to the driver and front seat passenger, air curtains used in SUVs, or in ordinary passenger vehicles, must be capable of remaining inflated in the range of from about three (3) to about twelve (12) seconds, depending upon the size of the curtain and the type of vehicle. An average passenger vehicle would require a side curtain of from about 60 inches to about 120 inches in length as measured along the length of the vehicle, while a larger vehicle, such as a minivan, would require an even longer side curtain. The maximum inflation period of a side curtain should be sufficient to protect the cabin occupants during three (3) rollovers, the maximum usually experienced in such incidents.

When such air bags are deployed, depending upon their specific location or application, they may be subjected to pressures within a relatively broad range. For example, air bag deployment pressures are generally in the range of from about 50 kilopascals (kpa) to about 450 kpa, which corresponds generally to a range of from about 7.4 pounds per square inch (psi) to about 66.2 psi. Accordingly, there is a need for fabric products and air bags that can be made to be relatively impermeable to fluids under such anticipated pressures while being of relatively light weight.

One means of improving air holding capability in vehicle restraint systems has been through coatings, such as chloroprene and silicone rubber coatings, which are applied to the textile substrate. However, these coated air bags are not susceptible to heat sealing and are usually made by stitching, a process that requires the addition of an adhesive sealant in the stitched areas. To alleviate this problem there have been developed improved polyurethane, acrylic, polyamide and silicone coatings that are coated singly or in layers on the fabric substrates. It has been disclosed in the art, for example, in Menzel et at., U.S. Pat. No. 5,110,666, to coat a woven nylon substrate with polyurethane to provide the desired permeability to better retain the inflation gas. Certain aqueous silicone emulsion coating compositions that yield a tack-free surface and high mechanical strength to prevent cracking on inflation of the air bag have also been disclosed in the art, such as, for example, in Inoue et al., U.S. Pat. No. 5,254,621.

Wherever coated fabrics are used, however, there exists the problem of insufficiency of adhesion of the coating to the fabric substrate. More particularly, the smoother the substrate surface, generally the more difficult it is to obtain strong adhesion of the coating material to the substrate. Therefore, much attention has been paid to the problems associated with adhesion of coatings to woven substrates, and in particular to multiple coatings of one or more polymeric materials on woven and non-woven fabric substrates of polyesters and polyamides, including combinations as well as mixed deniers of those fabric substrates. Examples of such coated fabric substrates, coating materials and methods of coating such fabrics are disclosed in commonly assigned U.S. Pat. Nos. 6,239,046; 6,350,709; 6,455,449; 6,458,724; 6,641,686; 6,645,565; and 6,734,123, the disclosures of each of which are incorporated by reference herein and made a part of this disclosure.

Despite advances in air bag coating technology, there remain problems related to the controlling of air permeability, air pressure, and volume. In particular means to accomplish these important functions while at the same time reducing the already high cost of production of air bags and side curtains in a highly cost competitive environment is of paramount concern. In this respect, polysiloxane coatings are very expensive and OPW fabrics often require a second coating of polyurethane to accomplish the sealing effect required for a side curtain. Polyvinyl chloride coatings are much less expensive than polysiloxane coatings, but have not been considered acceptable for use as air bag coatings because of problems of adhesion (sticking) due to the relatively low melting point of polyvinyl chloride compared to polyurethane and polysiloxane. Moreover, it was thought that polyvinyl chloride would not work well in air bags as a result of adhesion or sticking during long periods of storage because of its relatively low melting point. The problem of sticking became of increasing concern with the advent of the OPW air bag fabric used in side curtains, which have two interior facing inflation surfaces that must not stick together when the air bag is deployed.

I have invented a product and process by which polyvinyl chloride is used to coat flat woven air bag fabric as well as prefabricated OPW fabric for use in side curtains. The polyvinyl chloride-coated products of this invention are typically used, preferably in conjunction with so-called cold inflators, and can be used alone or in combination with polyurethane coatings, if desired. The polyvinyl chloride coatings of the invention provide substantially equally effective air holding capability and aging characteristics as do the polysiloxane and polyurethane coatings of the prior art and adhere well to polyester woven fabrics commonly used in air bags and side curtains. Moreover, when the polyvinyl chloride coatings are used in combination with polyurethane coatings, additional benefits in terms of air holding capability are obtained.

SUMMARY OF THE INVENTION

It has been found that by applying either a single coating of polyvinyl chloride, or a plurality of coating layers that includes polyvinyl chloride, for cut, sew and seal applications either to flat one-layer textiles of woven, non-woven or multi-directional construction, or to a woven textile fabric substrate having preconfigured air holding cavities (OPW), an air-holding vehicle restraint system is obtained that has superior air holding characteristics, namely, air permeability, volume and air pressure retention. Further, if a multi-layered woven textile fabric substrate having top and a bottom surfaces is first coated on both surfaces with an adhesive polyurethane layer and, thereafter, the adhesive polyurethane layer is coated with a layer of polyvinyl chloride, the air bag formed therefrom has superior air holding permeability and volume.

In one embodiment of the invention, a one-piece woven (OPW) multi-layered textile fabric having first and second opposed outer surfaces and preconfigured air-holding cavities therein, is coated with at least a first coating layer of adhesive polyurethane on a first surface, and at least a second coating layer of polyvinyl chloride on the first coating layer. In one preferred embodiment, the OPW comprises at least a first coating layer of adhesive polyurethane and a second coating layer of a polymeric material of adhesive polyurethane or polyvinyl chloride.

The multi-layer textile fabric is preferably a fabric constructed from synthetic material, preferably selected from the group consisting of polyamides and polyesters. In the preferred or mixed denier polyester nylon embodiment, the coated textile substrate is a woven nylon fabric, and the first coating layer is selected from the group consisting of aromatic or aliphatic polyester, polyether and polycarbonate polyurethanes. The second coating layers are polyvinyl chloride. Preferably, one of the first coating layers is coated with a second coating layer of elastomeric polyurethane and the other first coating layer is coated with a second coating layer of polyvinyl chloride.

In a preferred embodiment, a coated textile fabric for an air-holding vehicle restraint system is disclosed, which comprises a multilayered woven fabric substrate having first and second opposed outer surfaces and preconfigured air holding woven cavities defined between the fabric layers, at least a first coating layer of adhesive polyurethane coated on both the first and second outer surfaces of the textile fabric, at least a second coating layer of elastomeric polyurethane or polyvinyl chloride, and at least a third coating layer of a polymeric material coated on at least one of the second coating layers.

The coated woven textile substrate is preferably a fabric constructed from synthetic material, wherein the synthetic material is a synthetic filamentary material selected from the group consisting of polyamides and polyesters and or mixed deniers or synthetic Filaments. Also, the woven textile fabric is preferably comprised of woven nylon filaments. The first coating layers are preferably selected from the group consisting of aromatic or aliphatic polyester, polyether and polycarbonate polyurethanes. The first coating layers are preferably coated with a second coating layer of elastomeric polyurethane or first layer of polyvinyl chloride and second layer of polyurethane. One of the first coating layers may be coated with a second coating layer of elastomeric polyurethane or coated with a second coating layer of polyvinyl chloride. The second coating layer of polyvinyl chloride may also be coated with a third coating layer of elastomeric polyurethane, and the second coating layer of polyvinyl chloride may itself be coated with a third coating layer of polyvinyl chloride. The second coating layer of polyurethane is preferably coated with a third coating layer of elastomeric polyurethane, and the second coating layer of polyvinyl chloride is preferably coated with a third coating layer of polyvinyl chloride.

Preferably, the first coating layers of adhesive polyurethane or polyvinyl chloride each have a coating weight of from about 0.3 ounces/sq. yd to about 5.0 ounces/sq. yd. Further, the preferred coating weight is about 0.5 ounces/sq. yd. The second coating layer is preferably an elastomeric aliphatic or aromatic polyether, polyester or polycarbonate polyurethane or polyvinyl chloride having a solids content of from about 25% to about 100% by weight and preferably weighs about 1 ounce/sq. yd to about 8 ounces/sq. yd. and preferably about 2 ounces/sq. yd. The third coating layer is preferably an elastomeric aromatic or aliphatic polyether or polyester polyurethane having a coating weight of from about 0.2 ounces/sq. yd. to about 2.0 ounces/sq. yd.

A method of coating a textile fabric for an air-holding vehicle restraint system is disclosed, which comprises coating an adhesive polyurethane or polyvinyl chloride to a first surface of a multi-layered textile fabric having opposed surfaces and drying at an elevated temperature to form a first coating layer, coating an elastomeric polyurethane or polyvinyl chloride to said adhesive polyurethane coating layer and drying at an elevated temperature to form a second coating layer, and coating a polyether, polyester or polycarbonate polyurethane to the second polyurethane coating layer and drying at an elevated temperature to form a third coating layer. The multi-layer textile substrate is a fabric constructed from synthetic fibers selected from the group consisting of polyamides and polyesters, mixed denier or different filament types. The multi-layered textile substrate is a woven multi-layered fabric having opposed layers forming preconfigured pockets having air-holding cavities, the pockets being connected by fabric web connectors formed at least in part of fabric portions of dual thickness and fabric portions of opposed fabric layers stitched together at predetermined locations. The multi-layered textile fabric is preferably woven from nylon filaments or polyester or mixed denier and mixed filament types.

A method of forming an air-holding restraint system for a vehicle is also disclosed, which comprises, coating an adhesive polyurethane or polyvinyl chloride to a first surface of a multi-layered textile fabric to form a first coating layer, coating an elastomeric polyurethane or polyvinyl chloride to the first coating layer to form a second coating layer, coating a top-coating of a polyester or polyether polyurethane to form a third coating layer, repeating steps (a), (b), and (c) on a second surface of the multi-layered textile fabric, and sealing the first and second coated textile fabrics together by radio frequency sealing, hot air sealing or ultrasonic sealing.

DETAILED DESCRIPTION OF THE PREFERRED EMBODIMENTS

It has been found that when woven textile fabric substrates, including those having preconfigured air-holding cavities therein, are coated with multiple layers of polymeric coatings, including polyurethane and/or polyvinyl chloride, such coated fabrics can be used to produce air-holding vehicle safety restraint systems having improved air retention, air permeability and volume properties. Such coated fabric substrates have the additional ability to be joined by means other than, or in addition to, sewing, including such means as heat sealing, radio frequency (RF) welding, and vulcanization. It has also been found that when such textile fabrics are coated with a polyurethane layer and thereafter, with a layer of polyvinyl chloride, or layers of polyvinyl chloride and polyurethane, and converted into an air bag or other vehicle restraint device such as a side air curtain, they exhibit improved air-holding characteristics. Examples of the methods of coating such fabrics are disclosed in U.S. Pat. Nos. 6,239,046 and 6,458,724. In such restraint systems, it has been found that the use of a multi-layered textile fabric substrate which includes layers which are already partially attached, reduces the need for excessive cutting and attaching, this reducing the possibility of air loss upon deployment.

Either natural or synthetic fibers can be employed to form the textile fabric substrate contemplated herein, with polyamide or polyester filaments or fibers being preferred. Such fibers can be in the form of either a woven, knit, or non-woven fabric. Woven multi-layered textiles having preconfigured air-holding cavities, such as those that can be produced on a Jacquard machine or a Dobby loom, particularly are contemplated herein as textile fabric substrates that can be coated in accordance with the present invention. The preconfigured air-holding cavities can be of any size or shape such as, for example, pockets, tubular channels and the like. Woven nylon is the specific textile fabric substrate that is preferred. Any denier size, shape and weaving configuration can be employed to advantage. Generally, the shape or configuration to be employed in the air-holding restraint system will depend upon its ultimate location in the vehicle. For example, driver or passenger air bags will generally be elliptical, spherical or circular in shape, while side air curtains will generally be rectangular or oval in configuration.

The coating of the fabric substrate with the desired layers of polyurethane and/or polyvinyl chloride takes place on a coating line that has multiple coating stations with driers positioned in sequence. Prior to applying the first adhesive polyurethane coating layer, the fabric substrate is heat-set and stabilized by passing it through an oven or hot cylinders at an elevated temperature(s) of from about 200° F. to about 425° F. Thereafter, the fabric substrate is coated in accordance with the present invention. The multi-layered woven textile fabric is coated in accordance with the methods disclosed herein.

According to one aspect of the present invention, as can be seen by reference to FIGS. 1-5, a textile fabric substrate 10 is first coated on its upper or top surface 12 with an adhesive polyurethane layer 14, referred to as a prime coat or adhesive coat, which serves to adhesively bond the filaments of the textile fabric so they do not comb or unravel. The adhesive polyurethane used in the prime coat or first layer 14 can be selected from among aromatic or aliphatic polyether, polyester and polycarbonate polyurethanes and, preferable those having a solids content of from about 25% to about 60%, by weight. The polyurethane coating weight applied is about 0.3 ounces/square yard to about 1.5 ounces/square yard with about 0.5 ounces/square yard being preferred. These types of polyurethanes provide good adhesion to nylon and satisfactory hydrolysis, i.e., resistance to breakdown under ambient storage conditions, to insure that the air bag or air curtain will be ready for use when deployed.

Figure 1:
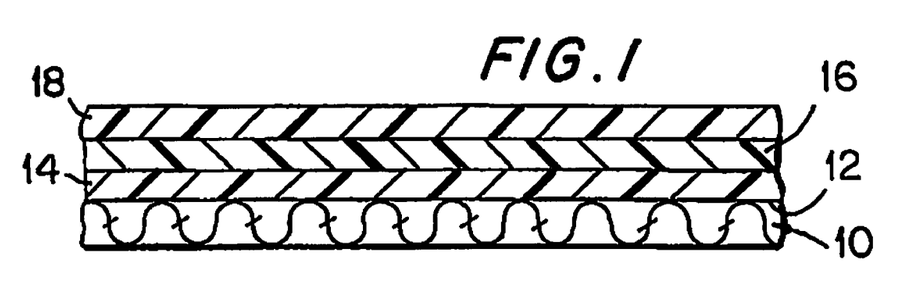
FIG. 1 is a cross-sectional view of a single layer textile fabric having a plurality of polyurethane and polyvinyl chloride coating layers on one surface.

Preferably, the prime coat layer 14 in FIG. 1 completely covers the entire outer surface 12 of the fabric 10. Alternatively, it can be applied as a partial coating which coincides with a particular predetermined area of the fabric. Particular patterns, such as stripes, wavy lines, etc., with different coating weights also can be employed to obtain the level of air permeability desired. The adhesive or prime coating layer is then dried in an oven at a temperature in the range of from about 225° F. to about 450° F. for about 1.5 minutes to about 3.0 minutes while advancing the fabric at a speed of about 1,000 yards per hour to about 3,000 yards per hour. During this process, a speed of about 1,200 yards per hour is preferred. The prime coat polyurethane layer and the nylon fabric filaments crosslink with each other during this process to form a polymer chain.

Referring again to FIG. 1, at a second coating station, a second layer 16 of polyvinyl chloride is deposited and coated onto the first layer 14. The polyvinyl chloride layer 16 adheres to the prime coat layer 14 to establish a composite of the two layers. The polyvinyl chloride layer 16 has a solids content of from about 25% to about 100% solids, by weight. Optionally, depending upon the chemical and physical properties sought to be introduced into the air bag, there is also added, for example, flameproofing agents, such as aluminum trihydrate or antimony trioxide, mildew prevention agents, such as BP5 by Morton Thiokol and UV and ozone resistance agents, e.g. Tinuvin 765 by Ciba Geigy. The coating weight is within the range of about 1 ounce/square yard to about 8 ounces/square yard, with about 2 ounces/sq. yard being preferred. It is then dried in an oven which is maintained at an elevated temperature from about 350° F. to about 450° F.

Figure 2:
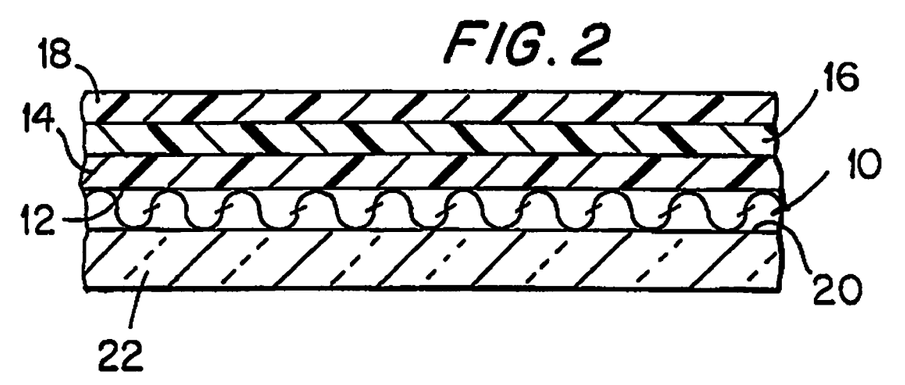
FIG. 2 is a cross-sectional view of a single layer textile fabric having a plurality of polyurethane coating layers on one surface as illustrated in FIG. 1, and a polyvinyl chloride coating on the opposite or reverse surface.

Thereafter, if desired, a third layer or topcoat 18 of an aliphatic or aromatic polyether, polyester or polycarbonate polyurethane is coated onto the second polyvinyl chloride layer 16 as is shown in FIGS. 1 and 2. As noted, in this application the top coat layer 18 is intended to prevent blocking or self-sticking of the air bag layers to each other when the bag is in its collapsed folded condition, and during deployment. As noted further, the preferred coating weight is from about 0.2 to about 2.0 ounces per square yard with a coating weight of about 0.5 ounces/sq. yard preferred. This coating layer is heated at an elevated temperature of from about 250° F. to about 425° F. for 1.5 to 3.0 minutes in an oven, during which it crosslinks with the second coating layer.

The laminated or composite structures depicted in FIGS. 1-5 typically form a panel of an air bag or an air curtain after die cutting into the desired configuration by the air bag manufacturer. A complementary composite structure, similar in all respects to the composite structures shown in the figures forms the opposite panel of the air bag or air curtain. In accordance with the present invention, the two (2) panels are then sealed together about their respective peripheries by sealing the polyurethane or polyvinyl chloride layers together, by radio frequency (RF) sealing, hot air sealing or ultrasonic sealing at from about 10 to about 80 megahertz and at a temperature of from about 250° F. to about 450° F., with RF sealing being preferred. Sealing in this manner serves to better control the air permeability of the bag while maintaining its integrity against air leakage, since conventional closing by stitching or sewing with its attendant inherent leakage problems are avoided. Employing a polyurethane-radio frequency sealing system is especially important in the manufacture of air-filled tubular curtains since the air or inflation gas must be held in the tubular structures which form the curtain for longer periods of time than with a conventional air bag. Such curtains must open within 2 to 3 milliseconds after a collision and must stay inflated for about 3 to about 12 seconds after deployment in the event of multiple rollovers, say, three (3) such rollovers in a single incident.

An alternative laminated or composite structure is shown in FIG. 2. In this arrangement, the upper or outer surface 12 of fabric 10 is coated with the same coating layers as shown in FIG. 1. However, in this embodiment, the bottom or inner surface 20 of fabric substrate 10 is coated with an additional layer of polyvinyl chloride 22. The coated fabric is then dried in an oven at a temperature of from about 275° F. to about 450° F. so as to permit the layers to become fused with the textile substrate. Layer 18 is preferably a polyvinyl chloride coating. The coating weight of the polyvinyl chloride layer 22 on the inner surface 20 is from about 0.5 ounces per square yard to about 5.0 ounces per square yard, with 1.2 ounces per square yard preferred. The polyvinyl chloride coating provides added protection to the fabric to protect against the high temperatures encountered during inflation with hot gases.

Figure 3:
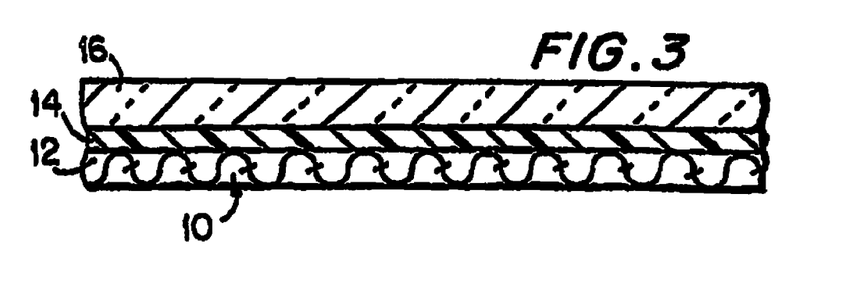
FIG. 3 is a cross-sectional view of a single layer textile fabric coated on one surface with a polyvinyl chloride layer and a polyurethane layer.

In another embodiment, as can be seen by reference to FIG. 3, a fabric substrate 10 is first coated on its upper or top surface 12 with a prime coat of an adhesive polyurethane layer 14, which serves to adhesively bond the filaments of the textile substrate so they do not comb or unravel. The polyurethane used in the prime coat or first layer 14 can be selected from among aliphatic and aromatic polyether, polyester and polycarbonate polyurethanes, preferably those having a solids content of from 25% to about 60%, by weight. These types of polyurethanes provide good adhesion to nylon and polyester and have satisfactory hydrolysis, i.e., resistance to breakdown under ambient storage conditions, to insure that the air bag, side curtain or the like will be ready for use when deployed.

Preferably, the prime coat layer 14 completely covers the entire surface 12 of the fabric 10, or it can be a partial coating dimensioned to coincide with a particular area of the fabric. Particular patterns, such as stripes, wavy lines, etc., with different coating weights, also can be employed to obtain the level of air permeability desired. The prime coat layer is then dried in an oven at an elevated temperature of from about 225° F. to about 425° F. for about 1.5 minutes to about 3.0 minutes while advancing the fabric at about 850 yds/hr. to about 3,500 yds./hr., with 1,500 yds/hrs. being preferred.

Figure 4:
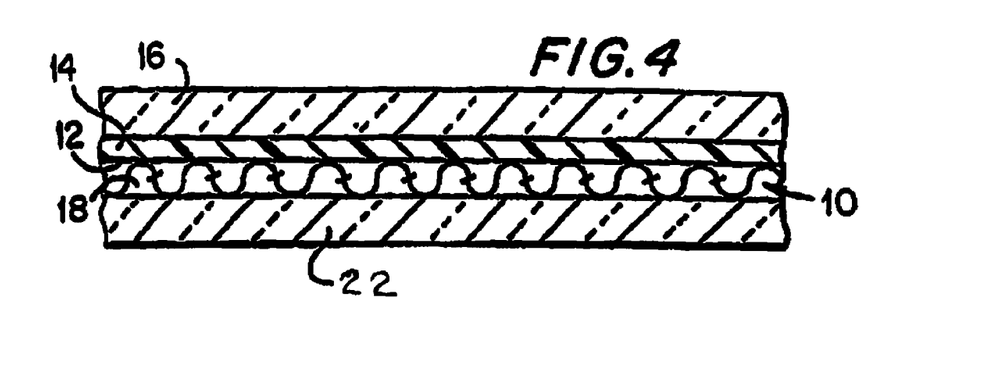
FIG. 4 is a cross-sectional view of a single layer textile fabric coated on one surface as illustrated in FIG. 3 and having a polyvinyl chloride coating on the reverse surface.
Figure 5:
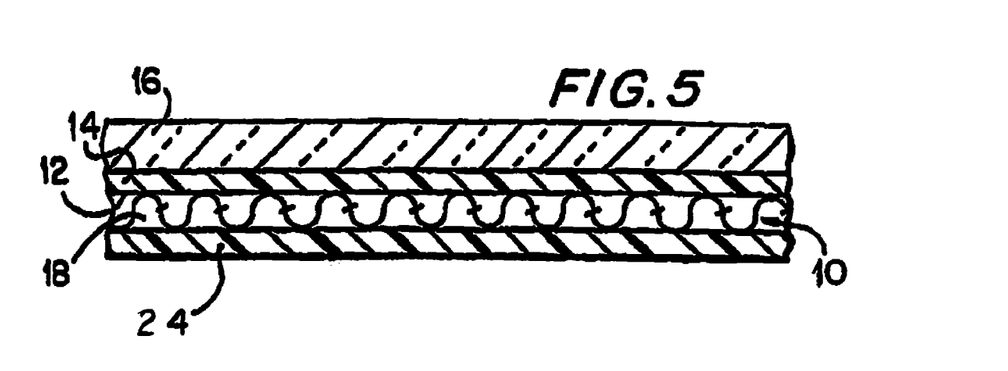
FIG. 5 is a cross-sectional view of a single layer textile fabric coating on one surface as illustrated in FIG. 3 and coated on the opposite surface with polyurethane.

Alternatively, at a second coating station, a polyvinyl chloride layer 16 is then coated onto the surface of the polyurethane layer 14 in overlying relationship thereto as shown in FIGS. 3-5. The coating weight of the polyvinyl chloride layer is about 0.5 ounces/sq. yd. to about 5.0 ounces/sq. yard, with about 1.2 ounces/sq. yard being preferred. It is then dried in an oven at an elevated temperature of from about 300° F. to 450° F.

In still another embodiment, there is illustrated in FIG. 4 the same composite structure as shown in FIG. 3 on the upper surface 12 of substrate 10, while the bottom or inner surface 18 is coated with a second polyvinyl chloride layer 22, which is similar in its chemical and physical properties to the polyvinyl chloride layer 16 shown in FIG. 3. In still another alternative embodiment, there is shown in FIG. 5 the same laminated structure as in FIG. 3 on the upper surface 12 of substrate 10, while the inner surface 18 is coated with a second polyurethane layer 24, which is similar in its composition and chemical and physical properties to the prime coat polyurethane layer 14 of FIG. 3. Having a polyurethane coating layer, or if desired, a plurality of polyurethane coating layers, on the inner surface of the substrate, serves to enhance the air holding capability of the air bag and affords better control of the air volume and air pressure.

In still further embodiments of the invention, a textile fabric to be used in the formation of a panel of an air bag or an air curtain such as that shown in FIGS. 1-5 can be coated with a single coating layer of polyvinyl chloride on the top surface of the fabric, a single coating layer of polyvinyl chloride on the bottom surface of the fabric, or coated with single coating layers of polyvinyl chloride on both the top and bottom surfaces of the fabric. Additionally, if desired, either or both of these polyvinyl chloride coating layers can be coated with at least a second overlying coating layer of polyurethane. In each of these additional embodiments sealing of the panels would be accomplished as described above.

Figure 6:
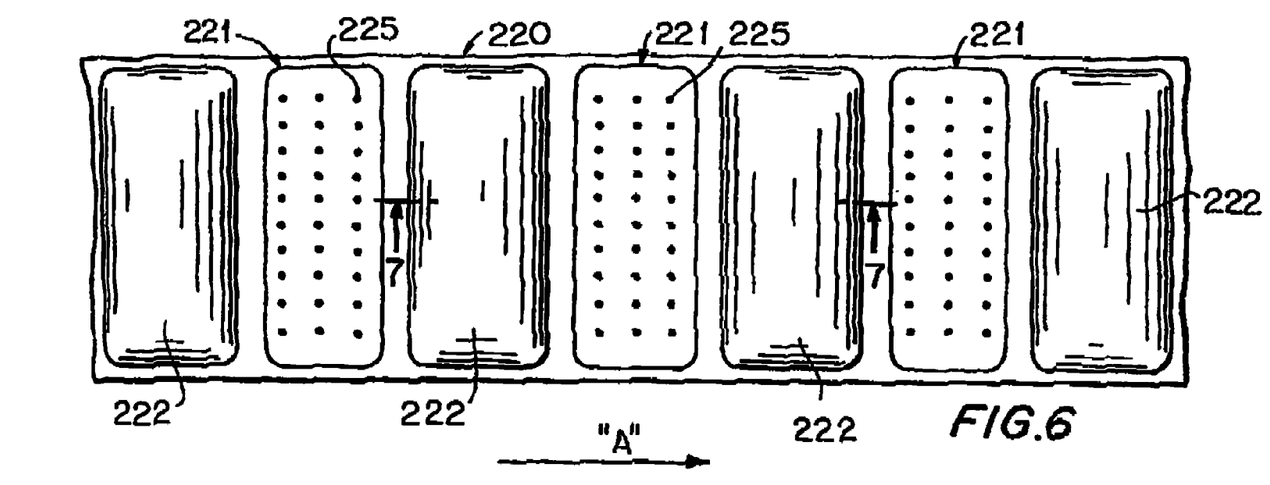
FIG. 6 is a top plan view of a continuous web of a multi-layered fabric having air-holding pockets defined between the multi-layers of fabric connectors.

One embodiment of the present invention involves coating multi-layered woven textile fabrics, such as those formed on Jacquard machines or Dobby looms. Further, such multi-layered textile fabrics are preferably woven of nylon filamentary materials and are made to have preconfigured air-holding pockets defining internal cavities without the need to join separate panels of fabric together by sewing, heat sealing, RF welding, etc., as discussed hereinabove. Alternative materials such as other polyamides, polyethers or other known air-holding pockets can be, for example, in the shape of tubular channels, or other geometric shapes, such as square, circular or oval in design. One such shape is shown in FIG. 6, which is a perspective view from above of a continuous web of uncoated multi-layered fabric 220 having a plurality of air-holding pockets 222 separated by woven connectors 221 moving in direction "A" through a coating process of the type described hereinabove. FIG. 6, is a top view of a continuous web of such fabric which has multiple pockets 222 that are comprised of separate fabric layers 226, 228 that form air-holding cavities 230 as shown for example in FIG. 7, which is a cross-section of FIG. 6 taken along the line 7-7. For illustration purposes, pockets 222 are shown in the inflated condition which occurs when the air bag is deployed by introduction of an inflating gas into the pockets 222.

Figure 7:
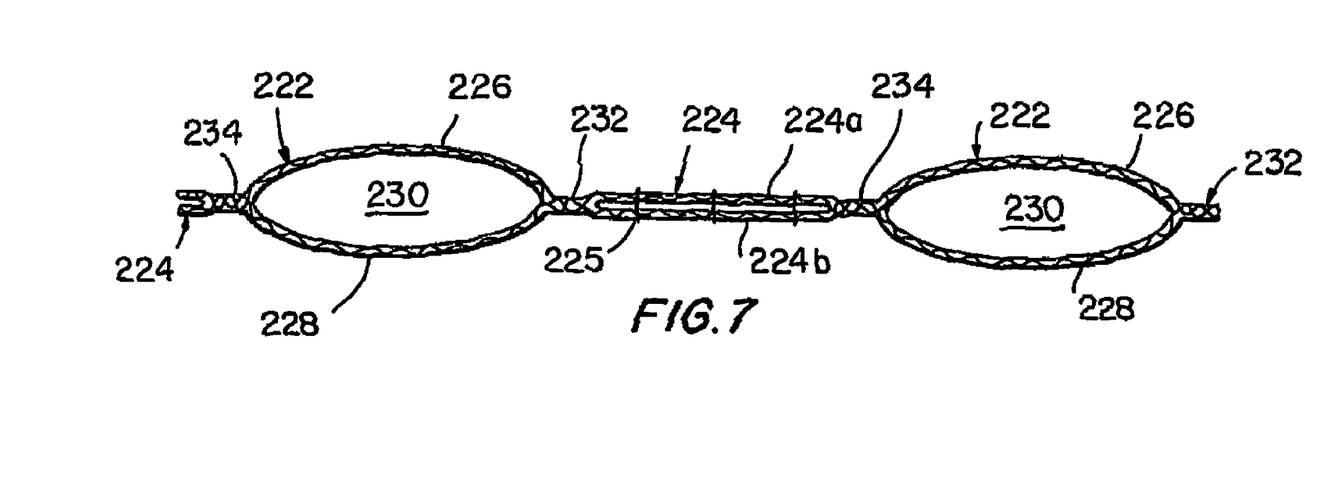
FIG. 7 is a cross-sectional view taken along lines 7-7 of FIG. 6, showing the multi-layered fabric web of FIG. 6 defining the air-holding pockets.

Referring again FIGS. 6-7, multi-layered fabric 220 is comprised of a plurality of fabric pockets 222 separated from each other by multi-layered fabric connectors 221 which are machine formed in continuous fashion with the pockets 222. Fabric connectors 221 are each comprised of relatively narrow width, or "minor" sections of fabric 232 and 234 immediately adjacent each pocket 222, respectively, which are connected to each other by dual layered fabric sections 224 which are formed continuously on a Jacquard machine or Dobby loom as separate layers of fabric 224a, 224b as shown in FIG. 7. Minor sections 232 and 234 are each formed as a single fabric of dual thickness whereby the filaments are interwoven in interlocking relation. The minor sections 232 and 234 of dual thickness fabric provide substantial supportive strength to the pockets 222 upon inflation, since they are immediately adjacent the pockets 222 and thereby define the outermost dimensions of the pockets 222. The dual layered fabric connectors 224 are stitched together by stitches 225 shown schematically in FIGS. 6 and 7, and are intended as connective devices which connect the pockets 222 to each other. As noted, although the pockets 222 are shown in FIG. 6 to be generally rectangular in plan view, any shape or combinations of shapes is contemplated, such as tubular, circular, wavy, etc. Further, although not shown in FIG. 6-7, appropriate channels are provided to hold gas conduits or the like to direct the inflating gas into all of the pockets 222 to inflate the side air curtain.

Figure 8:
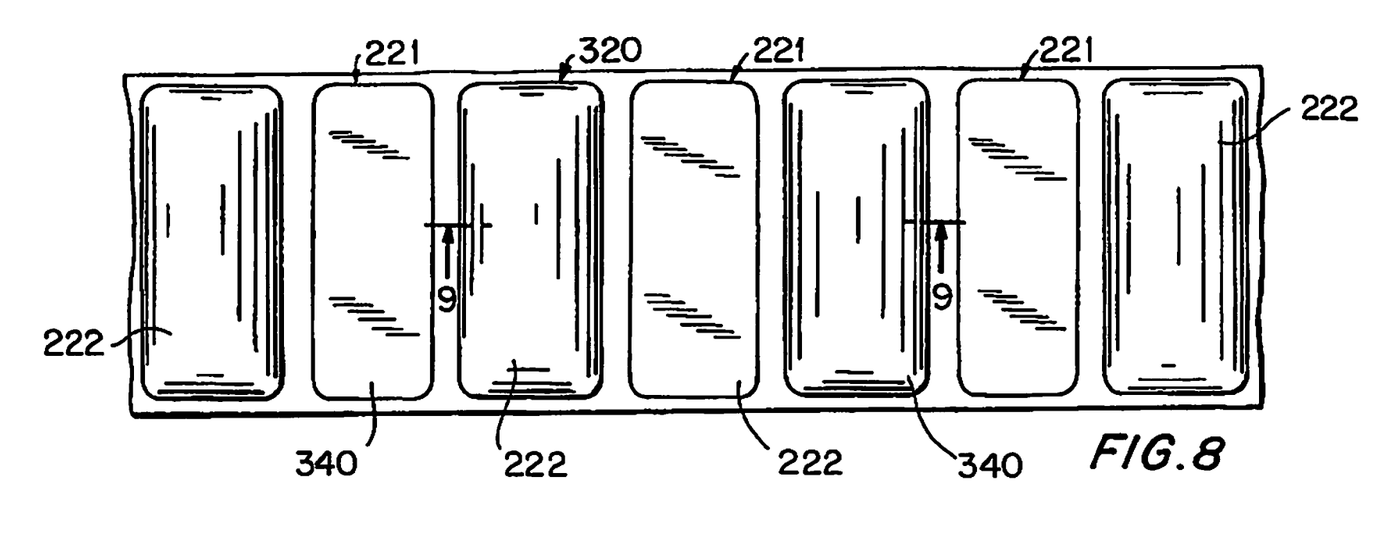
FIG. 8 is a top plan view of the continuous web of a multi-layered fabric of FIG. 6, coated in accordance with the present invention.
Figure 9:
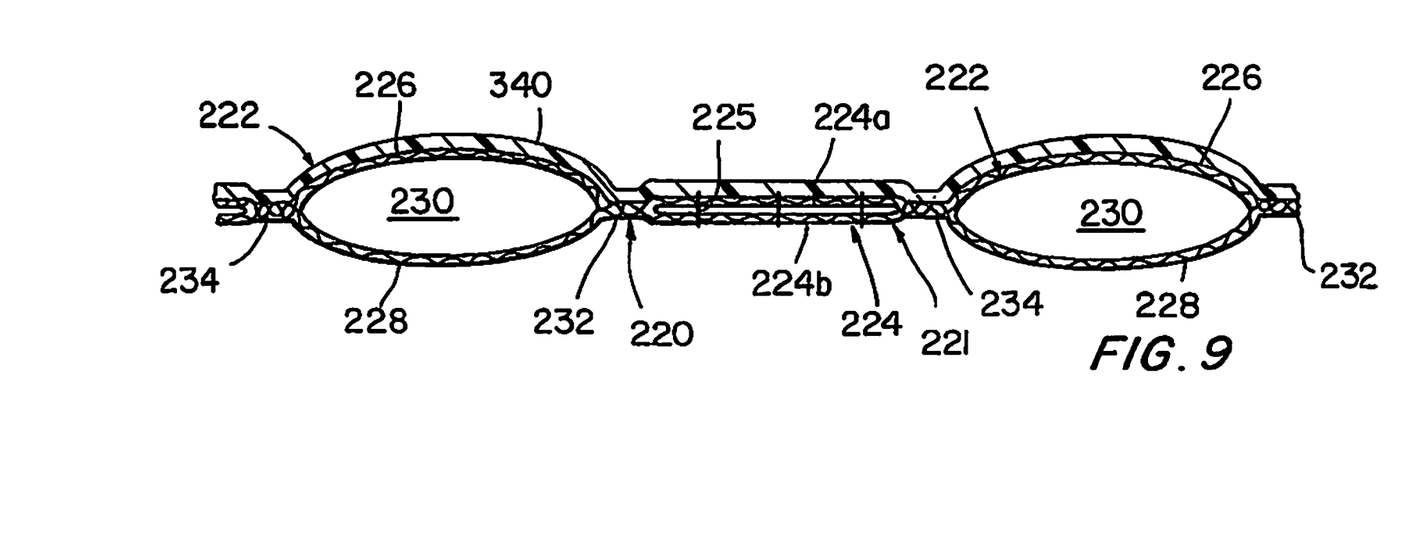
FIG. 9 is a cross-sectional view taken along lines 9-9 of FIG. 8, showing the coated fabric of FIG. 8 defining coated multi-layered air-holding pockets.

Referring now to FIG. 8-9, there is shown the continuous multi-layers web 220 of FIG. 6, after completion of a coating process as described hereinabove in connection with any of FIGS. 1-5. The web 220 of FIG. 6-7 is shown as coated web 320 in FIG. 8 so as to distinguish the coated multi-layered fabric from the uncoated fabric 220 of FIGS. 6-7. As can be seen in FIGS. 8-9, the coated multi-layered fabric web 320 is comprised of the fabric web 220 of FIGS. 6-7, having one or more layers of coating materials 340 thereon as disclosed in FIGS. 1-5. For convenience of illustration, the cross-sectional view of FIG. 9 illustrates a coating layer 340 as a single layer of coating material however; layer 340 is intended to depict any of the combination of layers of coating material as described in connection with FIGS. 1-5 or alternative combinations thereof. Furthermore, coating materials 340 is shown in FIG. 9 on one side only of fabric 220 for illustration purposes. However, both sides of the fabric web 220 may be coated as described, for example, in connection with FIGS. 2, 4 and 5.

Referring again to FIGS. 8-9, the multi-layered fabric 220 of FIGS. 6-7 includes multiple pockets 222 which define air holding pockets 230 as described in connections with FIGS. 6-7. The pockets 222 in FIGS. 8-9 are formed of separate fabric layers 226 and 228 as described in connection with FIGS. 6-7, and are coated or layered by one or more coating layers as described in connection with FIGS. 1-5, and as illustrated at 340 in FIG. 9 to form the coated multi-layered textile fabric web according to the invention.

Referring again to FIG. 6, the continuous web 220 of air-holding tubular pockets 222 is made to move in direction "A" through a coating process of the type described hereinabove. The tubular pockets 222 are shown separated by fabric connectors 221 as described above. The fabric connectors 221 are each formed of three separate sections, two minor sections 232 and 234 which are immediately adjacent to pockets 222, and which are of dual thickness and are formed of opposed separate fabric layers 224a and 224b. The minor sections 232, 234 and the layers 224a, 224b are formed continuously on the loom; however, the minor sections 232 and 234 are provided to add strength to the pockets 222, since they define the immediate margins thereof, and the layers 224a and 224b, which are machine produced at a relatively rapid rate, are merely stitched together on the forming machine and simply act as connectors for the pockets 222. The relative widthwise dimensions of minor sections 232 and 234 and the separate layers 224a and 224b will depend upon the individual design in each case, and will therefore vary in dependence upon the particular vehicle restraint device. Layers 224a and 224b are utilized where dual thickness strength is not required, since these layers are produced at a significantly faster rate than the rate of production of minor sections 232 and 234.

Referring now to FIG. 9 there is shown a cross-sectional view of the coated fabric of FIG. 8 taken along lines 9-9. The continuous fabric web 220 has multiple air-holding pockets 222 that are comprised of separate fabric layers 226 and 228, that form air-holding cavities 230 separated by fabric connectors 221 as described hereinabove. In the multi-layered woven fabric shown in FIGS. 6-7 and the coated embodiment of FIGS. 8-9, as well as others of different configurations, the air-holding pockets, tubular channels, etc. must be completely sealed around all woven areas and, in particular, around the areas of separation or segmentation, that form the individual air-holding cavities. Further, these multi-layered woven fabrics must be coated as described above, particularly with reference to FIGS. 1-5.

As noted, when the multi-layered woven fabric substrate of the present invention is coated in a process of the types described herein, it will have the same type of coating layers thereon as shown in the examples given in FIGS. 1-5. Preferably, it will have coating on both the top and bottom surfaces of the fabric substrate as shown in FIGS. 2, 4 and 5. Thus, the fabric substrate could have a polyurethane coating, such as that shown in FIG. 1, on one side, and a polyvinyl chloride coating, such as that shown in FIG. 3, on the other side, Alternatively, the fabric substrate could also have a polyurethane coating on both sides. Similarly, the fabric substrate could have a polyvinyl chloride coating on both sides. The woven fabric substrate may also have any other combination of polyurethane and/or polyvinyl chloride coatings, on either side, as shown in the examples of any of FIGS. 1-5. For example, the first coating layer of adhesive polyurethane may be coated with a second coating layer of elastomeric polyurethane or polyvinyl chloride. The elastomeric polyurethane and polyvinyl chloride layers, however, may be coated only with like polymeric materials, e.g. polyurethane-polyurethane and polyvinyl chloride. As noted, polyvinyl chloride ordinarily will adhere to a layer of polyurethane, and polyurethane will adhere to a layer of polyvinyl chloride. However, either of these polymeric materials will adhere to the adhesive polyurethane layer or the polyvinyl chloride as disclosed.

These coated multi-layered textile fabrics with preconfigured air-holding cavities will have the same superior air-holding and other properties as the fabric substrates referred to in the co-pending parent applications of which this application is a continuation-in-part. The woven textile fabrics of the invention are coated and prepared as "roll goods", i.e. they are manufactured as a continuous roll of coated fabric. The fabrics are later cut into predetermined lengths, sewn, heat sealed or RF welded, or combinations thereof, into the appropriate size and shape desired for installation into a particular automotive vehicle. These shapes may also include sealed "dead air" zones in which no inflation will occur, such as where seat backs or other automotive structures require no impact protection. After the safety device is prefabricated and adapted for installation in a particular vehicle, it is fitted with inflation tubes (not shown) through which it will receive the inflation gas that is generated by the inflator when the device is deployed. The inflation tube is typically sewn or clamped into the device at either or both of its ends, depending upon the size of the side air curtain. The inflation tubes will deliver the inflation gas to the individual air-holding pockets or tubular air-holding channels shown in the examples of the figures herein, to produce a fully operational automotive vehicle safety restraint device.

What is claimed is:

1. A coated textile fabric for an air-holding vehicle restraint system which comprises:
   a) a textile fabric having opposed outer surfaces; and
   b) a coating layer of polyvinyl chloride on at least one surface thereof.

2. The coated textile fabric of claim 1 in which at least one coating layer of polyvinyl chloride has an overlying coating layer of an elastomeric polyurethane selected from the group consisting of aromatic or aliphatic polyester, polyether and polycarbonate polyurethanes.

3. The coated textile fabric of claim 2 in which at least one overlying coating layer of elastomeric polyurethane has an overlying coating layer of polyvinyl chloride or elastomeric polyurethane.

4. The coated textile fabric of claim 1 in which at least one of said outer surfaces is coated with an elastomeric polyurethane selected from the group consisting of aromatic or aliphatic polyester, polyether and polycarbonate polyurethanes and one of said surfaces is coated with a coating of polyvinyl chloride.

5. The coated textile fabric of claim 1 in which at least one of said outer surfaces is coated with an elastomeric polyurethane selected from the group consisting of aromatic or aliphatic polyester, polyether and polycarbonate polyurethanes and at least one of said coated surfaces is coated with an overlying coating of polyvinyl chloride.

6. The coated textile fabric of claim 1 in which the textile fabric is selected from the group consisting of polyamides and polyesters, mixed deniers and mixed filaments.

7. The coated textile fabric of claim 1 wherein said coated textile fabric is a woven nylon or polyester fabric.

8. A coated textile fabric for an air-holding vehicle restraint system, which comprises:
   a) a multi-layered textile fabric having first and second opposed outer surfaces and preconfigured air-holding cavities therein;
   b) at least one coating layer of polyvinyl chloride coated on at least one of said opposed outer surfaces of said textile fabric.

9. The coated textile fabric of claim 8 in which at least one coating layer of polyvinyl chloride has an overlying coating layer of an elastomeric polyurethane selected from the group consisting of aromatic or aliphatic polyester, polyether and polycarbonate polyurethanes.

10. The coated textile fabric of claim 9 in which at least one overlying coating layer of elastomeric polyurethane has an overlying coating layer of polyvinyl chloride or elastomeric polyurethane.

11. The coated textile fabric of claim 8 in which at least one of said outer surfaces is coated with an elastomeric polyurethane selected from the group consisting of aromatic or aliphatic polyester, polyether and polycarbonate polyurethanes and one of said coated surfaces is coated with an overlying coating of polyvinyl chloride.

12. The coated textile fabric of claim 8 wherein said synthetic material is selected from the group consisting of polyamides and polyesters, mixed denier and mixed filaments.

13. The coated textile fabric of claim 8 wherein said coated textile fabric is a woven nylon or polyester fabric.

* * * * *